(12) United States Patent
Kanaya et al.

(10) Patent No.: US 7,802,905 B2
(45) Date of Patent: Sep. 28, 2010

(54) LIGHT DIFFUSER PLATE

(75) Inventors: Hiroko Kanaya, Ehime (JP); Akiyoshi Kanemitsu, Ehime (JP)

(73) Assignee: Sumitomo Chemical Company, Limited, Tokyo (JP)

(*) Notice: Subject to any disclaimer, the term of this patent is extended or adjusted under 35 U.S.C. 154(b) by 72 days.

(21) Appl. No.: 11/950,084

(22) Filed: Dec. 4, 2007

(65) Prior Publication Data

US 2008/0130293 A1  Jun. 5, 2008

(30) Foreign Application Priority Data

Dec. 5, 2006  (JP)  ............... 2006-327932

(51) Int. Cl.
*F21V 5/02* (2006.01)

(52) U.S. Cl. ...................... 362/339; 362/355

(58) Field of Classification Search ................ 362/339, 362/355
See application file for complete search history.

(56) References Cited

U.S. PATENT DOCUMENTS

| | | | |
|---|---|---|---|
| 6,683,717 B1 * | 1/2004 | Miyatake et al. ............ 362/558 |
| 2002/0009573 A1 | 1/2002 | Kimura et al. |
| 2005/0152038 A1 | 7/2005 | Nishida et al. |
| 2006/0098452 A1 | 5/2006 | Choi et al. |
| 2006/0114369 A1 | 6/2006 | Lee et al. |
| 2006/0240200 A1 | 10/2006 | Parusel et al. |
| 2007/0160828 A1 | 7/2007 | Iyama |
| 2009/0129059 A1 * | 5/2009 | Kumasawa et al. ......... 362/355 |
| 2009/0296024 A1 * | 12/2009 | Kanaya et al. ............. 362/97.1 |

FOREIGN PATENT DOCUMENTS

| | | |
|---|---|---|
| CN | 1503009 A | 6/2004 |
| CN | 1555498 A | 12/2004 |
| CN | 1829936 A | 9/2006 |
| JP | 03142401 A | 6/1991 |
| JP | 2005-309399 A | 11/2005 |
| JP | 2006-11419 A | 1/2006 |
| JP | 2006-139238 A | 6/2006 |
| JP | 2006-518541 A | 8/2006 |
| PL | 315565 A1 | 2/1997 |

* cited by examiner

*Primary Examiner*—David V Bruce
(74) *Attorney, Agent, or Firm*—Sughrue Mion, PLLC

(57) ABSTRACT

The present invention provides a light diffuser plate, the surface of which is less likely to be scratched, capable of laminating a film base material (3) with a high lamination strength.

The light diffuser plate (1) of the present invention includes a transparent material and a light diffusing agent dispersed in the transparent material, wherein one or both surfaces are rough surfaces (1a) having a ten-point average roughness (Rz) of 20 to 40 μm. A film-laminated light diffuser plate (4) can be obtained by laminating an adhesive film (5) comprising the film base material (3) and an adhesive layer (2) formed on at least one surface of the film base material on the rough surface.

2 Claims, 1 Drawing Sheet

# LIGHT DIFFUSER PLATE

BACKGROUND OF THE INVENTION

1. Field of the Invention

This application was filed claiming Paris Convention priority of Japanese Patent Application No. 2006-327932, the entire content of which is herein incorporated by reference.

The present invention relates to a light diffuser plate.

2. Description of the Related Art

A light diffuser plate comprising a transparent material and a light diffusing agent dispersed in the transparent material is widely used as an optical member which constitutes a surface light source device used in a state of being incorporated into the back side of a liquid crystal cell in a liquid crystal display device. The surface of the light diffuser plate is a smooth surface having a ten-point average roughness (Rz) of 10 μm or less.

The light diffuser plate is also used as a film-laminated light diffuser plate in a state where a film base material such as a phase difference film or a polarizing film is laminated on the surface via an adhesive layer (cf. Patent Literature 1).

Patent Literature 1: JP-A-2006-139238
Patent Literature 2: JP-A-2006-518541

The light diffuser plate is preferably a light diffuser plate, the surface of which is less likely to be scratched, in view of easy handling upon lamination of the film base material. It is also required that the light diffuser plate is capable of laminating the film base material with a high lamination strength.

SUMMARY OF THE INVENTION

The present inventors have intensively studied so as to develop a light diffuser plate, the surface of which is less likely to be scratched, capable of laminating a film base material with a high lamination strength. Thus, the present invention has been completed.

Namely, the present invention provides a light diffuser plate (1) comprising a transparent material and a light diffusing agent dispersed in the transparent material, wherein one or both surfaces are rough surfaces (1a) having a ten-point average roughness (Rz) of 20 to 40 μm.

The light diffuser plate (1) of the present invention is a light diffuser plate, the surface of which is less likely to be scratched, capable of laminating a film base material with a high lamination strength.

BRIEF DESCRIPTION OF THE REFERENCE SYMBOLS

Figure 1:
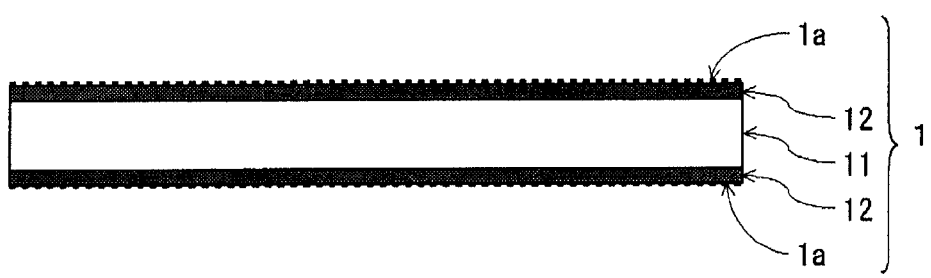
FIG. 1 is a view schematically showing a cross section of a light diffuser plate of the present invention.

1: Light diffuser plate
1a: Rough surface
11: Main layer
12: Surface layer
2: Adhesive layer
3: Film base material
3a: One surface
4: Film-laminated light diffuser plate
5: Adhesive film

DETAILED DESCRIPTION OF THE INVENTION

A cross section of the light diffuser plate (1) of the present invention is schematically shown in FIG. 1. As the transparent material which constitutes the light diffuser plate (1) of the present invention, a transparent thermoplastic resin is commonly used because it is comparatively light weight and is easily processed. Examples of the transparent thermoplastic resin include an olefin resin such as polyethylene or polypropylene, a methacryl resin containing a methyl methacrylate unit as a main component, a polycarbonate resin, a styrene resin, a methyl methacrylate-styrene copolymer resin, and a cyclic olefin resin.

The light diffusing agent to be dispersed in the transparent material may be particles which are incompatible with the transparent material and commonly show a difference in a refractive index between the light diffusing agent and the transparent material of 0.02 of more, and also transmit light (L) incident on the light diffuser plate (1) while diffusing. The light diffusing agent may be inorganic particles made of an inorganic material, or organic particles made of an organic material.

Examples of the inorganic particles include particles made of silica, aluminum oxide, aluminum hydroxide, calcium carbonate, barium carbonate, titanium oxide, talc, and glass beads.

Examples of the organic particles include resin particles which are incompatible with the transparent resin, and specific examples thereof are methacrylic crosslinked resin particles, methacrylic high molecular weight resin particles, styrenic crosslinked resin particles, styrenic high molecular weight resin particles, and siloxane-based crosslinked resin particles.

The amount of the light diffusing agent to be dispersed is appropriately selected according to the degree of light diffusion in the objective light diffuser plate (1), and is commonly from 0.1 to 10 parts by mass based on 100 parts by mass of the transparent material.

The thickness of the light diffuser plate (1) of the present invention is commonly from 1 to 3 mm. In the light diffuser plate (1), one or both surfaces are rough surfaces (1a) and the ten-point average roughness (Rz) is from 20 to 40 μm, and preferably from 20 to 35 μm. When the ten-point average roughness (Rz) is less than 20 μm, the surface is likely to be scratched. When the ten-point average roughness is more than 40 μm, the lamination strength of the film base material (2) may become insufficient.

When a transparent thermoplastic resin is used as the transparent material, the light diffuser plate (1) can be produced by coextruding a light diffusing resin composition (P1) comprising a transparent thermoplastic resin and a light diffusing agent dispersed in the transparent thermoplastic resin and a coarse particle-containing resin composition (P2) comprising a transparent thermoplastic resin and coarse particles dispersed in the transparent thermoplastic resin.

As the coarse particles contained in the coarse particle-containing resin composition (P2), particles which are incompatible with the transparent thermoplastic resin are used and the particle diameter is commonly from 20 to 200 μm. Specific examples of the coarse particles include the same inorganic and organic particles as those described as the light diffusing agent. The amount of the coarse particles to be dispersed is commonly from 15 to 40 parts by mass based on 100 parts by mass of the transparent thermoplastic resin.

The light diffusing resin composition (P1) and the coarse particle-containing resin composition (P2) are coextruded in a conventional manner, and the light diffusing resin composition (P1) and the coarse particle-containing resin composition (P2) may be coextruded through a die so as to form a surface layer (12) formed of the coarse particle-containing resin composition (P2) on one or both surfaces of a main layer (11) formed of the light diffusing resin composition (P1). The thickness of the surface layer (12) is commonly from 30 to 80 µm.

During a process of cooling and solidifying after extruding through a die, coarse particles float on the surface of the surface layer (12) formed of the coarse particle-containing resin composition (P2) to form the objective rough surface (1a). The ten-point average roughness (Rz) of the rough surface (1a) can be appropriately adjusted by the particle diameter of the coarse particles, the amount of coarse particles to be dispersed, the cooling rate in the case of cooling and solidifying after coextruding through the die, and the rolling pressure in the case of rolling using a polishing roll after coextruding through the die. For example, in order to increase the ten-point average roughness (Rz), the amount of coarse particles may be increased, coarse particles having a large particle diameter may be used, or the rolling pressure may be decreased in the case of rolling at a low cooling rate.

Thus, it is made possible to obtain the light diffuser plate (1) of the present invention, with a multi-layered configuration comprising the main layer (11) formed of the light diffusing resin composition (P1) and the surface layer (12) formed of the coarse particle-containing resin composition (P2) as shown in FIG. 1. The light diffuser plate (1) may have a configuration in which both surfaces are rough surfaces (1a) and the surface layers (12) are laminated on both surfaces of the main layer (11), or may have a configuration in which one surface is a rough surface (1a) and the surface layer (12) is laminated only on one surface of the main layer.

The light diffuser plate (1) of the present invention may contain additives such as an ultraviolet absorber and a processing stabilizer, which are compatible with a transparent thermoplastic resin. These additives may be contained in the main layer (11), the surface layer (12), and both layers (11, 12).

In the light diffuser plate (1) of the present invention, one or both surf aces are rough surf aces (1a) having a ten-point average roughness (Rz) of 20 to 40 µm, and thus the surface is less likely to be scratched and through the adhesive layer (2) the film base material (3) can be laminated with a high strength.

As the adhesive which constitutes an adhesive layer (2), an acrylic adhesive, a urethane-based adhesive, a polyether-based adhesive and a silicone-based adhesive are commonly used in view of transparency. The thickness of the adhesive layer (2) is commonly from 10 to 30 µm.

Examples of the film base material (3) include a polarizing film, a phase difference film, a light diffusing film, a prism film, and a reflection-type polarization separating film.

Figure 2:
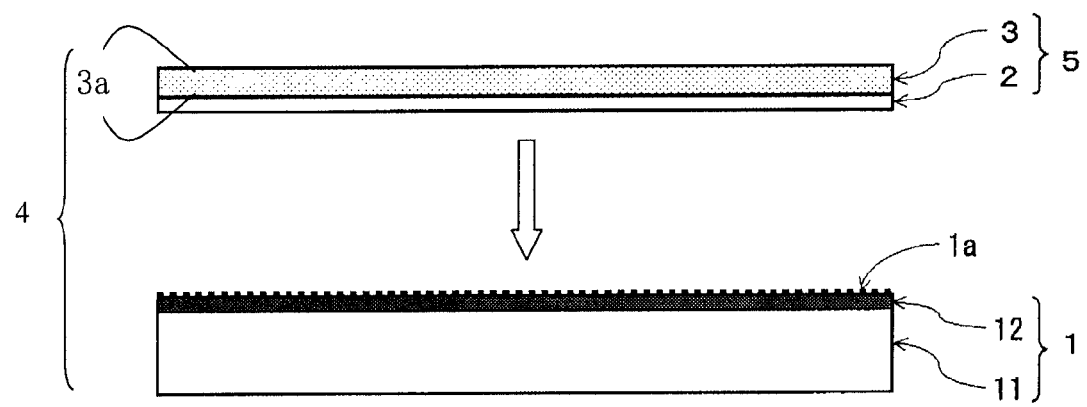
FIG. 2 is a view schematically showing a step of laminating a film base material (3) on a rough surface (1a) of a light diffuser plate.

In order to laminate the film base material (3) on a rough surface (1a) of a light diffuser plate, as shown in FIG. 2, using an adhesive film (5) comprising the film base material (3) and the adhesive layer (2) formed on at least one surface (3a) of the film base material (3) may be laminated. As a result of lamination, it is possible to obtain a film-laminated light diffuser plate (4) comprising the light diffuser plate (1) of the present invention and the film base material (3) laminated on the rough surface (1a) of the light diffuser plate via the adhesive layer (2). In the film-laminated light diffuser plate thus obtained, the film base material (3) is laminated on the light diffuser plate (1) with a high lamination strength.

EXAMPLES

The present invention will now be described in detail by way of Test Examples, but the present invention is not limited to the following Test Examples.

Test Example 1

Production of Light Diffusing Agent Master Batch

After 46 parts by mass of styrene resin pellets ["HRM40" manufactured by TOYO-STYRENE CO., LTD., refractive index: 1.59], 4 parts by mass of siloxane-based polymer particles [crosslinked polymer particles "Torayfill DY33-719" manufactured by Toray Dow Corning Corporation, refractive index: 1.42, volume average particle diameter: 2 µm], 2 parts by mass of a heat stabilizer ["Sumisorb 200" manufactured by Sumitomo Chemical Co., Ltd., powdered] and 2 parts by mass of a processing stabilizer ["Sumilizer GP" manufactured by Sumitomo Chemical Co., Ltd., powdered] were dry-blended, the resulting dry blend mixture was charged to a twin extruder through a hopper, kneaded with heat-melting, extruded into a strand shape at 250° C., and then cut into pellets to obtain a light diffusing agent master batch (pelletized).

Preparation of Coarse Particle-Containing Resin Composition 75.3 parts by mass of a styrene-methyl methacrylate copolymer resin ["MS200 NT" manufactured by Nippon Steel Chemical Co., Ltd., content of styrene unit: 80 by mass, content of methyl methacrylate unit: 20' by mass, refractive index: 1.57, pelletized, melt flow rate: 1.3 g/10 min], 23 parts by mass of acrylic polymer particles [crosslinked polymer particles "Sumipex XC1A" manufactured by Sumitomo Chemical Co., Ltd., refractive index: 1.49, volume average particle diameter: 25 µm], 2 parts by mass of an ultraviolet absorber ["Adekastab LA-31" manufactured by Asahi Denka Kogyo K.K., 2,2'-methylene-bis(4-tert-octyl(6-2H-benzotriazol-2-yl)phenol), powdered] and 2 parts by mass of a processing stabilizer ["Sumilizer GP" manufactured by Sumitomo Chemical Co., Ltd., powdered] were dry-blended to obtain a coarse particle-containing resin composition.

Production of Multi-Layered Structure Light Diffuser Plate

After 95 parts by mass of polystyrene resin pellets ["HRM40" manufactured by TOYO-STYRENE CO., LTD., refractive index: 1.59] and 5 parts by mass of the light diffusing agent master batch obtained above were dry-blended, the resulting dry blend mixture was supplied to an extruder having a screw diameter of 40 mm and heated to 235° C. under a bent portion pressure of 5.3 kPa (absolute pressure) to obtain a light diffusing resin composition (P1) in a molten state. Separately, the coarse particle-containing resin composition obtained above was supplied to an extruder having a screw diameter of 20 mm and heated to 230° C. under a bent portion pressure of 21.3 kPa (absolute pressure) to obtain a coarse particle-containing resin composition (P2) in a molten state.

The light diffusing resin composition (P1) and coarse particle-containing resin composition (P2) obtained above were transferred to a feed block (two-kind and three-layer configuration) and then coextruded through a T-die at a temperature of 245 to 250° C. and a width of 220 mm to obtain a light diffuser plate [thickness: 2 mm, width: 220 mm] (1) with a three-layer configuration comprising a main layer [thickness: 1.9 mm] (11) and a surface layer [thickness: 0.05 mm] (12) laminated on both surfaces of the main layer, wherein both surfaces are coarse surfaces (1a). The ten-point average roughness (Rz) of the surface of the light diffuser plate (1) was measured in accordance with JIS B0601 (1994) using a surface roughness tester ["SURFTEST P-201" manufactured by Mitsutoyo Corporation] and found to be 15.5 μm. The pencil hardness of the surface (1a) of the light diffuser plate (1) was measured in accordance with JIS K5600 (1999) and found to be H.

On the surface (1a) of the light diffuser plate (1), a polarizing film ["Sumikaran SR" manufactured by Sumitomo Chemical Co., Ltd.] (3) comprising an adhesive layer [thickness: 25 μm, an acrylic adhesive] (2) on one surface was laminated to obtain a polarizing film-laminated light diffuser plate (4). The peel strength test of the polarizing film laminated was measured in accordance with JIS K5600 (1999). As a result, the number of the layers of the polarizing film (3) peeled was 8. The results are shown in Table 1.

Test Example 2

Preparation of Coarse Particle-Containing Resin Composition 68.8 parts by mass of a styrene-methyl methacrylate copolymer resin ["MS200 NT" manufactured by Nippon Steel Chemical Co., Ltd.], 30 parts by mass of acrylic polymer particles [crosslinked polymer particles "MBX50" manufactured by Sekisui Plastic Co., Ltd., refractive index: 1.49, volume average particle diameter: 50 μm], 1 part by mass of an ultraviolet absorber ["Adekastab LA-31"] and 0.2 parts by mass of a processing stabilizer ["Sumilizer GP" manufactured by Sumitomo Chemical Co., Ltd., powdered] were dry-blended to obtain a coarse particle-containing resin composition.

Production of Multi-Layered Structure Light Diffuser Plate

In the same manner as in Example 1, except that the coarse particle-containing resin composition obtained above was used in place of the coarse particle-containing resin composition obtained in Example 1, a light diffuser plate (1) with a three-layer configuration was obtained. The results are shown in Table 1.

Test Examples 3 to 6

In the same manner as in Example 1, except that 30 parts by mass of acrylic polymer particles [crosslinked polymer particles "MBX100" manufactured by Sekisui Plastic Co., Ltd., refractive index: 1.49, volume average particle diameter: 100 μm] [Test Example 3], 30 parts by mass of acrylic polymer particles [crosslinked polymer particles "MBX200" manufactured by Sekisui Plastic Co., Ltd., refractive index: 1.49, volume average particle diameter: 200 μm] [Test Example 4], 30 parts by mass of acrylic polymer particles [crosslinked polymer particles "MBX80" manufactured by Sekisui Plastic Co., Ltd., refractive index: 1.49, volume average particle diameter: 80 μm] [Test Example 5] and 30 parts by mass of acrylic polymer particles [crosslinked polymer particles "MBX20" manufactured by Sekisui Plastic Co., Ltd., refractive index: 1.49, volume average particle diameter: 20 μm] [Test Example 6] were used in place of the acrylic polymer particles [MBX50], light diffuser plates (1) with a three-layer configuration were obtained. The results are shown in Table 1.

Test Example 7

Preparation of Coarse Particle-Containing Resin Composition 58.8 parts by mass of a styrene-methyl methacrylate copolymer resin ["MS200 NT" manufactured by Nippon Steel Chemical Co., Ltd.], 30 parts by mass of acrylic polymer particles [crosslinked polymer particles "MBX20" manufactured by Sekisui Plastic Co., Ltd., refractive index: 1.49, volume average particle diameter: 20 μm], 1 part by mass of an ultraviolet absorber ["Adekastab LA-31"] and 0.2 parts by mass of a processing stabilizer ["Sumilizer GP"] were dry-blended to obtain a coarse particle-containing resin composition.

Production of Multi-Layered Structure Light Diffuser Plate

In the same manner as in Example 1, except that the coarse particle-containing resin composition obtained above was used in place of the coarse particle-containing resin composition obtained in Example 1, a light diffuser plate (1) with a three-layer configuration was obtained. The results are shown in Table 1.

Test Examples 8 and 9

In the same manner as in Example 1, except that 30 parts by mass of acrylic polymer particles [crosslinked polymer particles "MBX80" manufactured by Sekisui Plastic Co., Ltd., refractive index: 1.49, volume average particle diameter: 80 μm] [Test Example 8] and 30 parts by mass of acrylic polymer particles [crosslinked polymer particles "Sumipex XC1A" manufactured by Sumitomo Chemical Co., Ltd., refractive index: 1.49, volume average particle diameter: 25 μm] [Test Example 9] were used in place of the acrylic polymer particles [MBX20], light diffuser plates (1) with a three-layer configuration were obtained. The results are shown in Table 1.

TABLE 1

| Test Example | 1 | 2 | 3 | 4 | 5 | 6 | 7 | 8 | 9 |
|---|---|---|---|---|---|---|---|---|---|
| Rz (μm) | 15.5 | 30.7 | 40.9 | 42.0 | 39.9 | 17.4 | 17.5 | 42.5 | 24.8 |
| Pencil hardness | H | 2H | 3H | 3H | 3H | 2H | 2H | 3H | 2H |
| Number of layers of film peeled | 8 | 0 | 92 | 100 | 64 | 20 | 8 | 100 | 0 |

The light diffuser plates of the present invention shown as Test Examples 2, 5 and 9 exhibit high pencil hardness and a small number of the layers of the film peeled.

In contrast, the light diffuser plates of the present invention shown as Test Examples 1, 3, 4, 6, 7 and 8 exhibit low pencil hardness or a large number of the layers of the film peeled.

The major embodiments and the preferred embodiments of the present invention are listed below.

[1] A light diffuser plate comprising a transparent material and a light diffusing agent dispersed in the transparent material, wherein one or both surfaces are rough surfaces having a ten-point average roughness (Rz) of 20 to 40 μm.

[2] A film-laminated light diffuser plate comprising the light diffuser plate according to [1], an adhesive layer and a film base material, the film base material being laminated on the rough surface of the light diffuser plate via the adhesive layer.

[3] A method for producing the film-laminated light diffuser plate according to [2], which comprises laminating an adhesive film on the rough surface, the adhesive film comprising the film base material and the adhesive layer formed on at least one surface of the film base material.

What is claimed is:

1. A film-laminated diffuser plate comprising
   a light diffuser plate, the light diffuser plate comprising a transparent material and a light diffusing agent dispersed in the transparent material, wherein one or both surfaces are rough surfaces having a ten-point average roughness (Rz) of 20 to 40 μm,
   an adhesive layer, and
   a film base material, the film base material being laminated on the rough surface of the light diffuser plate via the adhesive layer.

2. A method for producing the film-laminated light diffuser plate according to claim 1, which comprises laminating an adhesive film on the rough surface, the adhesive film comprising the film base material and the adhesive layer formed on at least one surface of the film base material.

* * * * *